United States Patent [19]

Ikeguchi

[11] Patent Number: 5,227,891
[45] Date of Patent: Jul. 13, 1993

[54] METHOD OF RECORDING FINE COLOR VIDEO SIGNAL ON OPTICAL RECORDING MEDIA AND METHOD OF REPRODUCING THUS RECORDED FINE COLOR VIDEO SIGNAL

[75] Inventor: Yasuyuki Ikeguchi, Osaka, Japan

[73] Assignee: Sanyo Electric Co., Ltd., Osaka, Japan

[21] Appl. No.: 420,074

[22] Filed: Oct. 11, 1989

[30] Foreign Application Priority Data

Oct. 12, 1988 [JP] Japan .................................. 63-256754

[51] Int. Cl.$^5$ ............................................. H04N 9/79
[52] U.S. Cl. ..................................... 358/330; 358/310
[58] Field of Search ............... 358/330, 310, 335, 322, 358/315, 341, 342, 343, 12, 332, 333; 360/19.1, 9.1

[56] References Cited

U.S. PATENT DOCUMENTS

| | | | |
|---|---|---|---|
| 4,768,104 | 8/1988 | Kanamaru | 358/343 |
| 4,796,097 | 1/1989 | Mashimo | 358/330 |
| 4,819,086 | 4/1989 | Hayashi et al. | 358/330 |
| 4,855,847 | 8/1989 | Kanamaru | 360/19.1 |
| 4,858,024 | 8/1989 | Kanamaru | 358/330 |
| 4,918,539 | 4/1990 | Hioki et al. | 358/343 |
| 4,961,116 | 10/1990 | Kanamaru et al. | 358/343 |

Primary Examiner—Tommy P. Chin
Assistant Examiner—Thai Tran
Attorney, Agent, or Firm—Nikaido Marmelstein Murray & Oram

[57] ABSTRACT

A fine color video signal including a fine component in a high frequency area has a level of an upper side band of the fine component raised by a predetermined level after FM modulation. An amplitude of the FM modulated color video signal is limited by a limiter amplifier, and as a result, levels of both the side bands become the same as an intermediate level between both the side band levels before limitation of the amplitude. Such an FM modulated color video signal is optically recorded on a video disc. In reproducing, a video disc player limits an amplitude of the reproduced FM color video signal after removal of the high frequency component thereof. Thus, both the side bands of the fine component become the same as a level of half the lower side band level before limitation of amplitude. Such an FM modulated color video signal is FM demodulated to be a fine color video signal.

15 Claims, 10 Drawing Sheets $\overrightarrow{AB}$ UPPER SIDE BAND
$\overrightarrow{AC}$ LOWER SIDE BAND
$\overrightarrow{OA}$ CARRIER
$\overrightarrow{OD}$ FM WAVE

ORIGINAL FM WAVE

SINGLE SIDE BAND FM WAVE

LIMITER AMPLIFIER OUTPUT

METHOD OF RECORDING FINE COLOR VIDEO SIGNAL ON OPTICAL RECORDING MEDIA AND METHOD OF REPRODUCING THUS RECORDED FINE COLOR VIDEO SIGNAL

BACKGROUND OF THE INVENTION

1. Field of the Invention

The present invention relates generally to a method of optically recording and reproducing a fine color video signal, and more particularly, a method of optically recording a fine color video signal on a video disc and a method of reproducing the recorded fine color video signal, a video disc on which a fine color video signal is recorded in such a recording manner, and a video disc player for such a video disc.

2. Description of the Background Art

A conventional video disc player for optically reproducing a color video signal of NTSC format optically recorded on a video disc is disclosed in Japanese publication "Laser Disc Technical Book" issued by Corporation ASCII, Nov. 1, 1986.

FIG. 2 is a frequency spectrum diagram showing an FM modulated NTSC color video signal to be recorded on such a conventional video disc. As shown in FIG. 2, the FM modulated video signal comprises an FM deviation area A, an upper side band B and a lower side band C in the range between 4 MHz–13.5 MHz. In the FM deviation area A of FIG. 2, a vertical direction indicates a time axis and a lateral direction indicates a voltage level. The above described FM modulation is performed such that a carrier frequency becomes 7.6 MHz in response to a sync-tip (horizontal synchronizing signal) a of the NTSC color video signal, 8.3 MHz in response to a pedestal level (black level) b, and 9.3 MHz in response to a white peak (white level) c.

On the other hand, a two channel FM audio signal D is recorded on a video disc, which is obtained by respectively FM-modulating a carrier of 2.3 MHz and a carrier of 2.8 MHz by audio signals of different channels.

In addition, a digital audio signal E having the same format as that of a compact disc is recorded on a low frequency side of the above described FM audio signal D. More specifically, two systems of stereo audio signals D and E can be recorded on the video disc, and the contents thereof may be the same or different from each other. In reproducing, either of the stereo audio signals is selected by the video disc player for reproduction.

In recent years, there is more demand for much finer picture reproduced from a video disc. However, with a normal band 4.2 MHz of a NTSC color video signal for broadcasting, sufficient fineness can not be achieved. Now, a method is proposed for forming a fine color video signal including a fine component in a high frequency side by extending a band of a color video signal to be recorded on a video disc to more than the above described 4.2 MHz (for example 5 MHz).

In case of FM-modulating such a fine color video signal for a recording on a video disc, basically, a frequency of an FM modulating carrier should be increased by a frequency corresponding to the extended amount of the above described band, and a linear speed of a recording track during rotation of the video disc should be increased according to a recording band. However, in this case, a recording time of the video disc becomes short, and compatibility with a video disc on which a conventional video signal is recorded is lost.

Now, proposed is a form of a fine color video signal which achieves a maximum compatibility by having a common recording band with that of a conventional color video signal. The video disc on which such form of fine color video signal is recorded and the video disc player for such a video disc are disclosed in Japanese Patent Application No. 63-56942 filed Mar. 10, 1988 by the assignee of the present application (not published yet nor known).

In a video disc produced by such a technique, a fine color video signal with its fine component being preemphasized is FM modulated and recorded with a lower side band of the fine component being multiplexed into a band of a conventional FM audio signal (D of FIG. 2).

Description will be given to a signal processing in reproducing a fine color video signal thus recorded on a video disc, with reference to frequency characteristic diagrams of FIG. 3 to FIG. 5.

Usually in frequency characteristic of an output of a reproduced signal from an optical pick-up of an optical video disc player, a reproduced output of a high frequency is extremely reduced. Accordingly, the frequency characteristics of a fine color video signal reproduced by the optical pick-up from the video disc will be as shown in FIG. 3, wherein the upper side band of the fine component is almost lost. The output having the frequency characteristic shown in FIG. 4 is obtained by passing the pick-up output as shown in FIG. 3 through a limiter amplifier to limit an amplitude thereof. More specifically, although the limiter amplifier functions, as will be described later, so as to reproduce asymmetrical side bands as symmetrical side bands, levels of both the side bands are remarkably lowered. Although the output shown in FIG. 5 will be obtained by FM demodulating the output of the limiter amplifier shown in FIG. 4, the high frequency level of the FM demodulated output will be lowered by the amount of a drop of the level of the upper side band of the limiter amplifier output as shown in FIG. 4. Compensation of a drop of the high frequency component of the FM demodulated output to flatten the frequency characteristic after FM demodulation leads an amplification of the noise component in the high frequency area, so that an S/N ratio is deteriorated as much.

Relation between such a drop of the side band level of the FM wave and deterioration of the frequency characteristic after FM demodulation will be theoretically explained furthermore with reference to FIG. 6 and FIG. 7.

FIG. 6 and FIGS. 7(a)-(c) are vector diagrams of an FM wave. In general, when a modulation index of the FM wave is small, a side band of second or higher order is ignorable. In FIG. 6, $\overrightarrow{OA}$ is a vector of a carrier, while $\overrightarrow{AB}$ and $\overrightarrow{AC}$ are vectors of the upper side band and the lower side band, respectively. A vector $\overrightarrow{OD}$ which is a composite of all these vectors will be a vector of FM wave.

Since both the side band vectors rotate in directions opposite to each other as shown in FIG. 6, at a modulating frequency, the composite vector $\overrightarrow{AD}$ of both the side bands moves to and from on a line perpendicular to a carrier vector $\overrightarrow{OA}$. The composite vector of the side band vectors represents a movement toward the carrier frequency, that is, the frequency modulation. More specifically, the magnitude of this vector represents a frequency deviation of the FM wave. If a level of one of the side bands is lowered, for example, if one of them disappears, a locus of the composite vector of the side bands draws a circle as shown in FIG. 7(b). As a result, the FM wave includes fluctuation in the direction of amplitude, that is, an amplitude modulation (AM) component in addition to fluctuation in the direction of frequency. By passing a signal having such an AM component through a limiter amplifier, the fluctuation in the direction of amplitude is suppressed, so that the composite vector of the side band vectors starts moving on the line perpendicular to the carrier vector $\overrightarrow{OA}$ as shown in FIG. 7(c). However, the magnitude, that is, the frequency deviation is half of that of the original FM wave. As shown in FIG. 7(c), FM demodulation of the FM wave having half the frequency deviation results in a lowered demodulation output level by half.

In addition, when the level of the one side band is lowered but does not disappear, a locus of the composite vector of both the side band vectors draws oval, and the frequency deviation of the FM wave becomes smaller similar to the above described case.

As the foregoing, since the upper side band of the fine component remarkably attenuates or disappears by a passing of the FM wave through the optical pick-up having such frequency characteristic as shown in FIG. 3, the high frequency output of the fine color video signal after FM demodulation is reduced, so that a sufficiently fine picture could not be obtained.

SUMMARY OF THE INVENTION

An object of the present invention is to achieve a video reproduction with high resolution from an optical recording media, especially from a video disc.

Another object of the present invention is to improve an S/N ratio of a reproduced picture of a video disc.

The present invention, in short, is a method of recording a fine color video signal on a video disc, comprising the steps of supplying a fine color video signal including a fine component in a high frequency area, FM modulating the fine color video signal, raising a level of at least one of upper and lower side bands of the fine component of the FM modulated color video signal by a predetermined level, limiting an amplitude of the FM modulated color video signal having the raised side band level, and optically recording the FM modulated color video signal with its amplitude being limited on the video disc.

According to another aspect of the present invention, a method of reproducing a fine color video signal from a video disc on which a fine color video signal is recorded by the above described recording process comprises the steps of optically reproducing an FM modulated color video signal from a video disc, removing a high frequency component from the reproduced FM modulated color video signal, limiting an amplitude of the FM modulated color video signal having its high frequency component being removed, and FM demodulating the FM modulated color video signal with its amplitude being limited.

A main advantage of the present invention is that deterioration of the high frequency component of the fine color video signal after FM demodulation can be compensated while improving an S/N ratio, as the FM modulated color video signal is recorded on the video disc with both side band levels being raised, in addition, in the video disc player, an amplitude is limited by a limiter amplifier after removal of the high frequency component of the reproduced FM modulated color video signal which is remarkably deteriorated by an optical pick-up.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
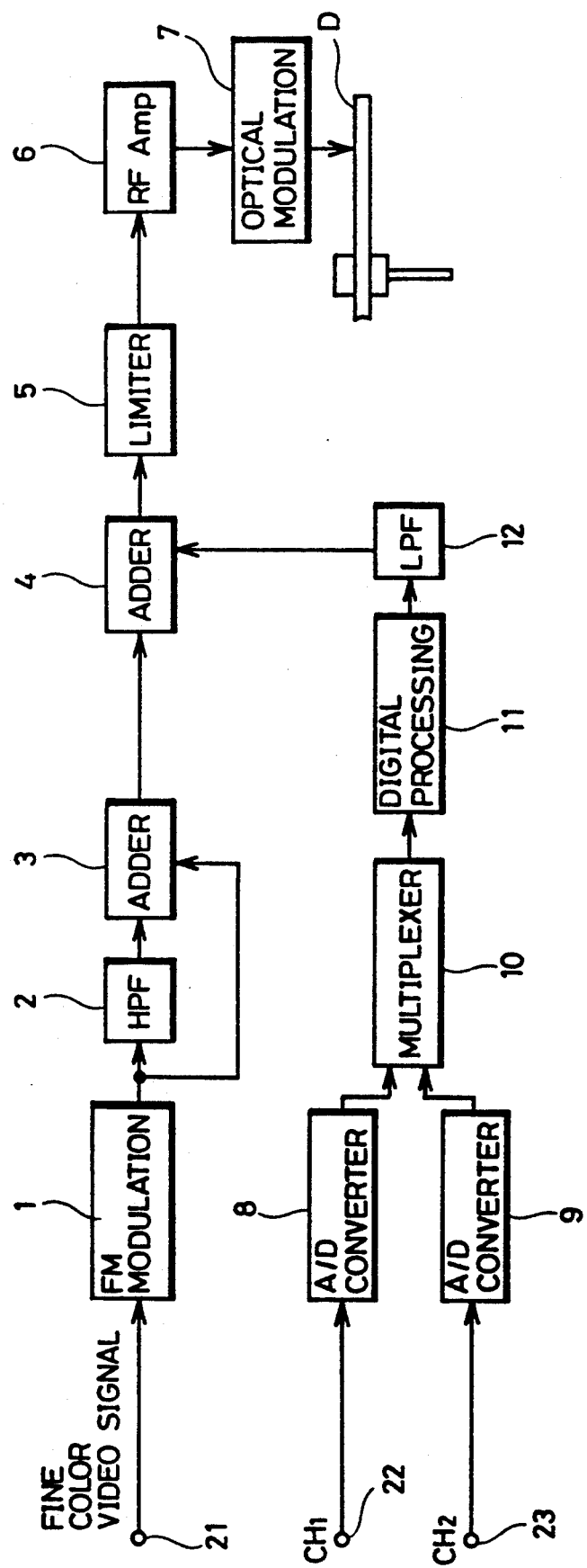
FIG. 1 is a block diagram showing a recording system of a fine color video signal according to one embodiment of the present invention.
Figure 2:
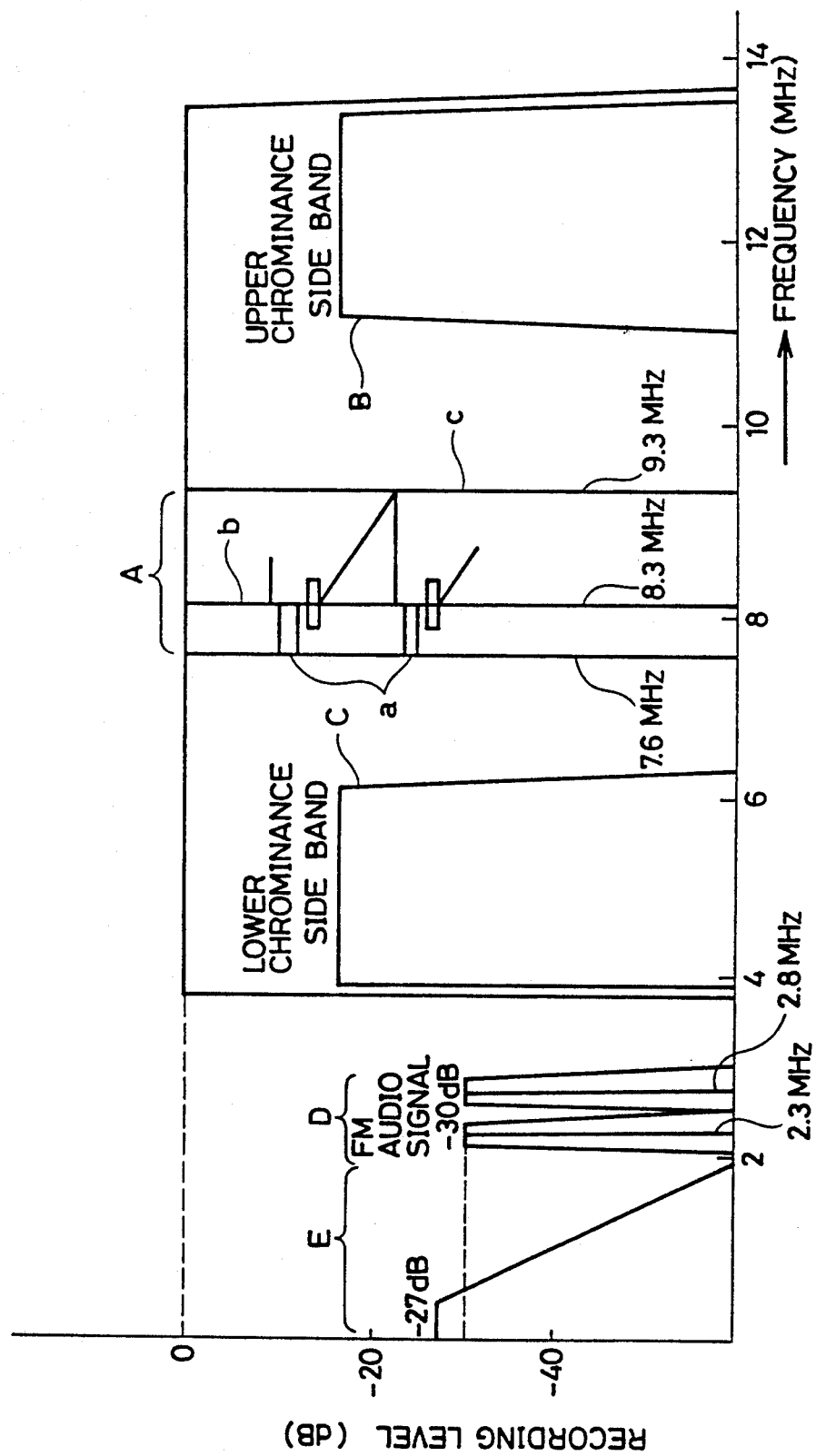
FIG. 2 is a frequency spectrum diagram showing an FM modulated conventional NTSC color video signal.

Referring to FIG. 1, a structure of the recording system of the fine color video signal according to one embodiment of the present invention will be described.

A fine color video signal of a base band including a fine component of higher frequency than 4.2 MHz, which is an extended band of a normal NTSC color video signal, is externally input to an input terminal 21. The fine color video signal supplied through the input terminal 21 is FM modulated by an FM modulation circuit 1, and thereafter applied to one input of an adder 3 through a high pass filter (HPF) 2 and at the same time applied directly to the other input of the adder 3. An output of the adder 3 is applied to one input of an adder 4.

On the other hand, an audio signal CH1 of a channel 1 and an audio signal CH2 of a channel 2 are externally input to input terminals 22 and 23, respectively. The audio signal CH1 of the channel 1 supplied through the input terminal 22 is applied to one input of a multiplexer 10 after conversion into a digital signal in an A/D converter circuit 8, and the audio signal CH2 of the channel 2 supplied through the input terminal 23 is applied to the other input of the multiplexer 10 after conversion into a digital signal in an A/D converter circuit 9. The digital signals applied to the multiplexer 10 are mixed with each other and then applied to a digital processing circuit 11, to be EFM (eight to fourteen modulation) modulated. An output of the digital processing circuit 11 is applied to the other input of the adder 4 through a low pass filter (LPF) 12. A cut-off frequency of the LPF 12 is set so as to fully allow the EFM modulated signal to pass.

An output of the adder 4 is applied to an optical modulator 7 through a limiter amplifier 5 and an RF amplifier 6. The optical modulator 7 optically modulates the applied signal to record the same on a video disc D.

Figure 8:
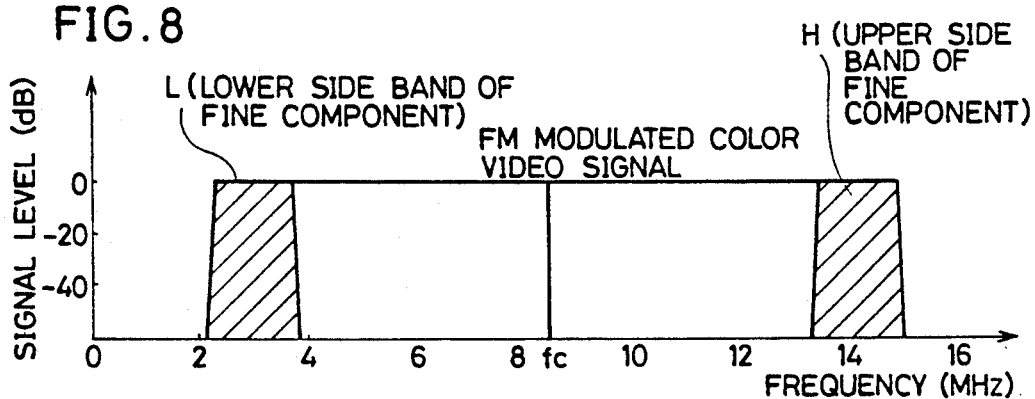
FIG. 8 to FIG. 11 are frequency spectrum diagrams for explaining an operation of the embodiment shown in FIG. 1.

Now, referring to the frequency spectrum diagrams of FIG. 8 to FIG. 11, operation of the embodiment shown in FIG. 1 will be described. The fine color video signal applied to the FM modulation circuit 1 is FM modulated to be an FM modulated color video signal having a frequency spectrum as shown in FIG. 8. In FIG. 8, parts H and L indicated with oblique lines represent the upper side band and the lower side band of the fine component, respectively, and a center region (4 MHz–13.5 MHz) includes an FM deviation region and upper and lower side bands of a signal generated by FM modulating a conventional NTSC color video signal not including a fine component.

Figure 9:
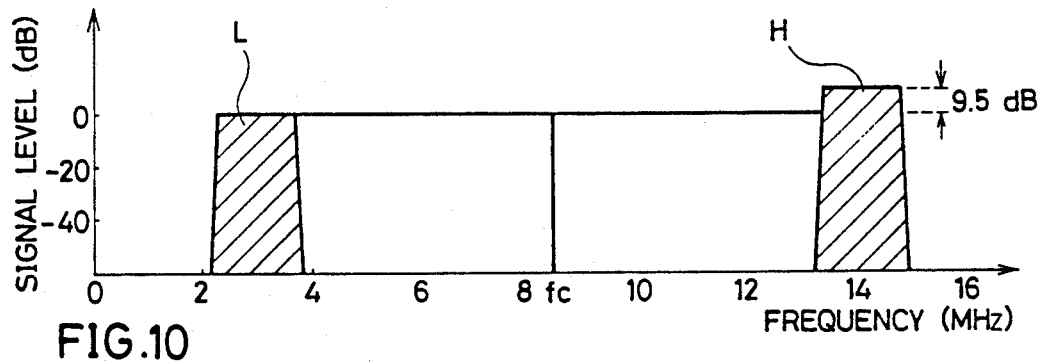

The HPF 2 for passing a signal having a frequency of more than 13.5 MHz takes out the upper side band of the fine component in the FM modulated color signal shown in FIG. 8 to apply the same to one input of the adder 3, and then the adder 3 amplifies the taken signal by means of a variable gain amplifier (not shown) and adds the same to the original FM modulated color video signal. Thus, as shown in FIG. 9, a level of the upper side band H of the fine component of the FM modulated color video signal is raised three times (by 9.5 dB) as that of FIG. 8.

Figure 10:
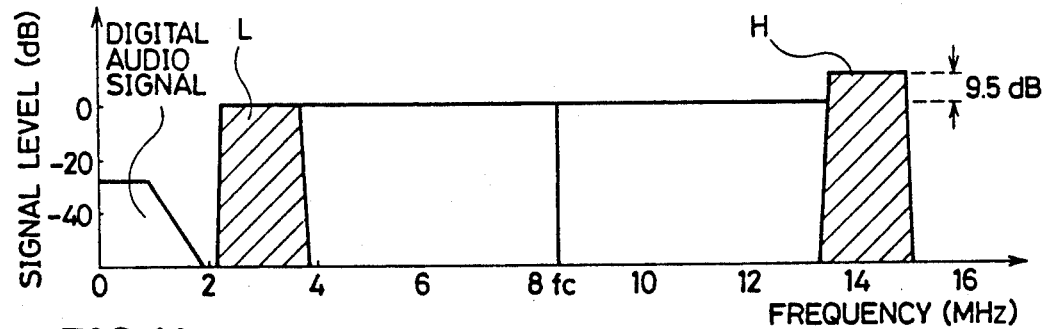
Figure 11:
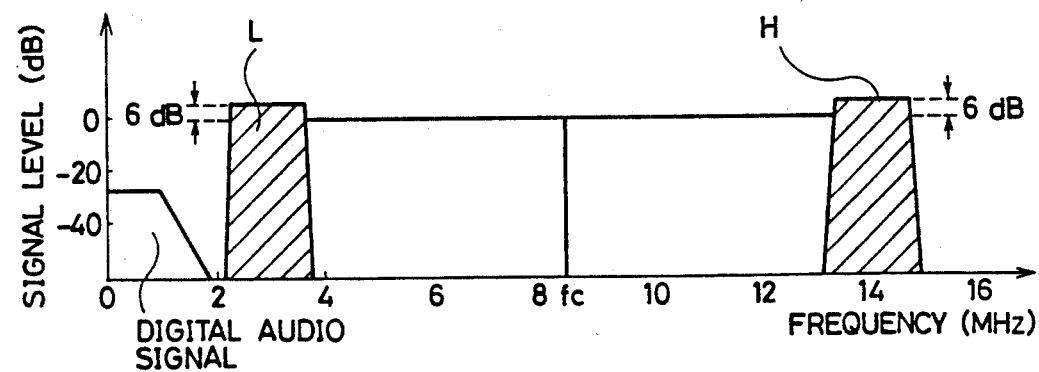

On the other hand, the EFM modulated digital audio signal having passed through the LPF 12 is added to the above described FM modulated color video signal with its upper side band of the fine component being raised, so that a signal having such a frequency spectrum as shown in FIG. 10 is obtained. An amplitude of an output of the adder 4 is limited by the limiter amplifier 5, so that a signal having such a frequency spectrum as shown in FIG. 11 is obtained. Now, with respect to the output of the adder 4, the levels of both the side bands are not the same, as shown in FIG. 10, the level of the upper side band H of the fine component is three times higher, that is, higher by 9.5 dB than the level of the lower side band L. If an amplitude of such a signal is limited by a limiter amplifier, the levels of both the side bands become the same, which is approximately an intermediate level between both the side band levels before limitation of the amplitude. In the present embodiment, a value of the intermediate level is two times the level of the FM deviation region, that is, about 6 dB as shown in FIG. 11. The output of the limiter amplifier 5 is recorded on a video disc D after optical modulation, thereby completing a fine video disc on which a fine color video signal is recorded.

Figure 12:
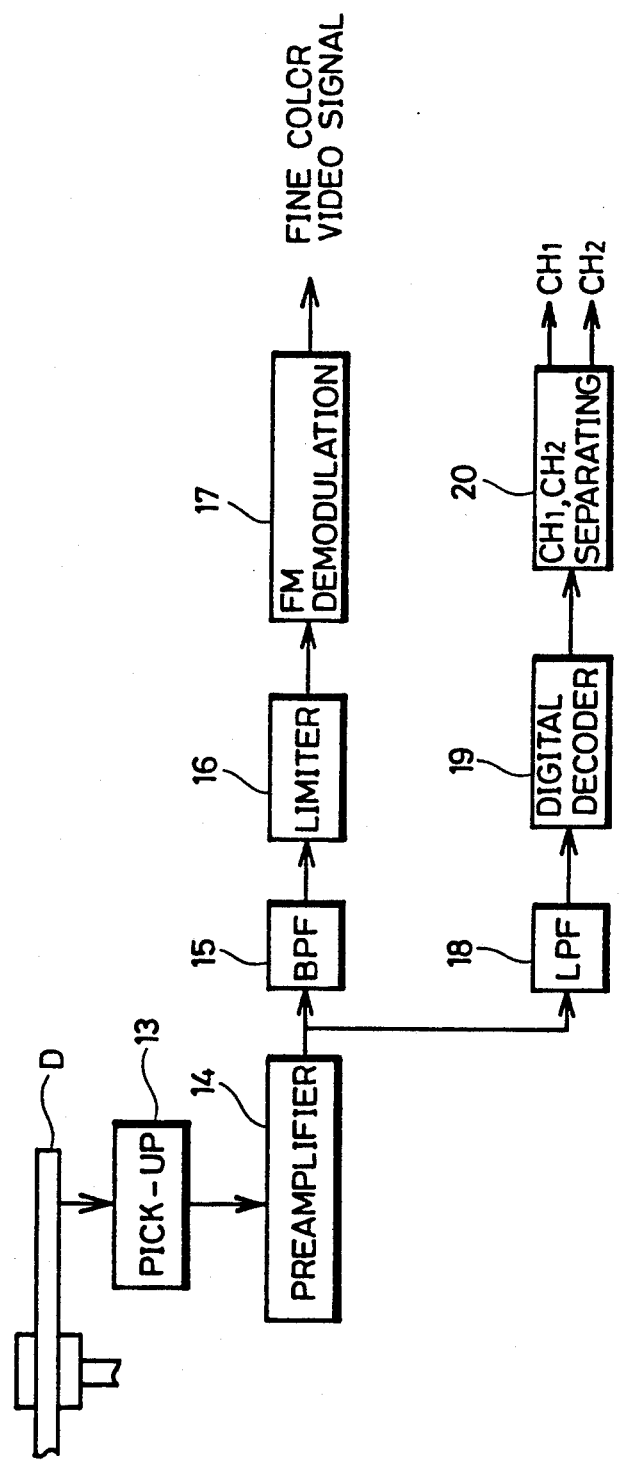
FIG. 12 is a block diagram showing a video disc player for reproducing a fine color video signal from a video disc accomplished by the recording system of the embodiment of FIG. 1.

FIG. 12 is a block diagram showing a reproducing system (video disc player) for reproducing a fine color video signal from the video disc thus completed by the recording system of the embodiment of FIG. 1. First, a structure of the reproducing system will be described.

The FM modulated signal thus recorded on the video disc D is reproduced by an optical pick-up 13, and is applied to a band pass filters (BPF) 15 and LPF 18 through a preamplifier 14. A cut-off frequency of the BPF 15 is set to 2 MHz–13.5 MHz, and only a signal of this band passes through the BPF 15 to be supplied to a limiter amplifier 16. An output of the limiter amplifier 16 is FM demodulated by an FM demodulation circuit 17 to be supplied as a fine color video signal. A cut-off frequency of the LPF 18 is set below 2 MHz, and only a signal of a frequency less than 2 MHz passes through the LPF 18 to be supplied to a digital decoder 19. An output of the digital decoder 19 is separated into digital audio signals of a channel 1 and a channel 2 by a channel separating circuit 20, then, the digital audio signals are converted into analog audio signals by D/A converter circuits (not shown), to be supplied as an audio signal CH1 of the channel 1 and an audio signal CH2 of the channel 2.

Figure 14:
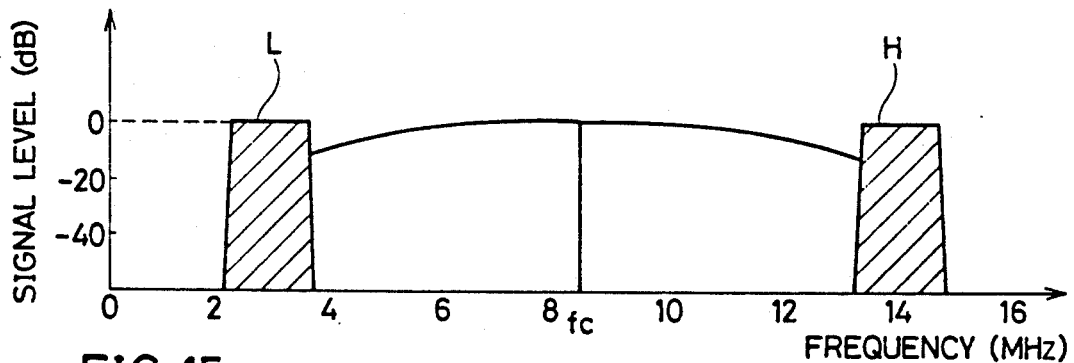
Figure 15:
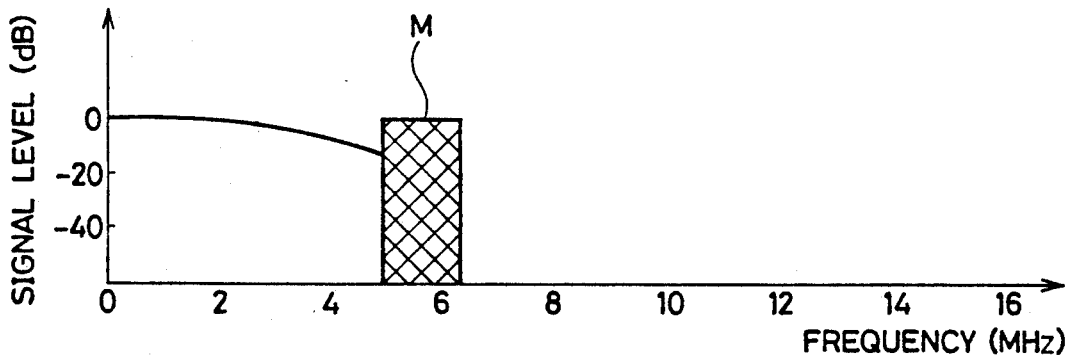

Now, referring to frequency spectrum diagrams of FIG. 13 to FIG. 15, operation of the reproduction system shown in FIG. 12 will be described.

Figures 3, 4, 5:
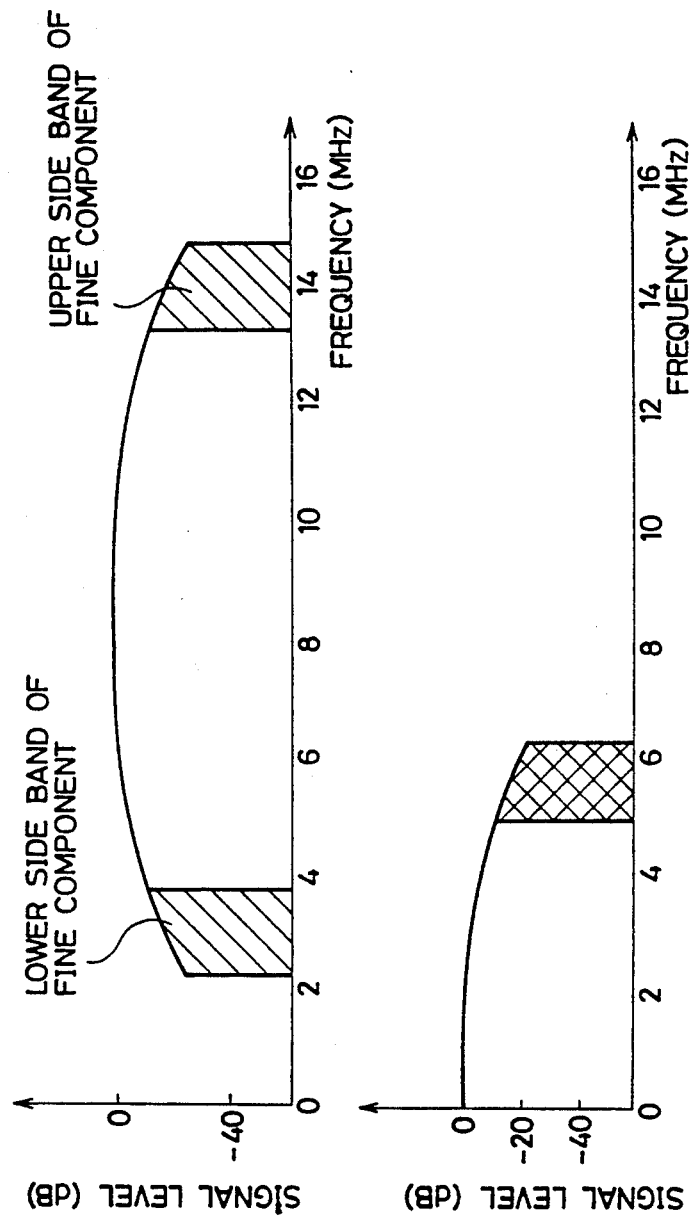
FIG. 3 to FIG. 5 are frequency characteristic diagrams showing a signal processing of a fine color video signal in reproducing according to a related technique.
Figure 6:
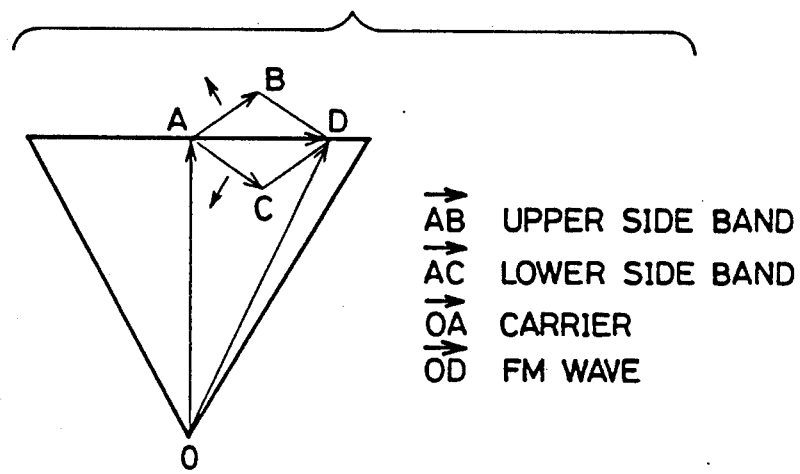
FIG. 6 and FIGS. 7(a)-7(c) are vector diagrams of an FM modulated color video signal.
Figure 7A:
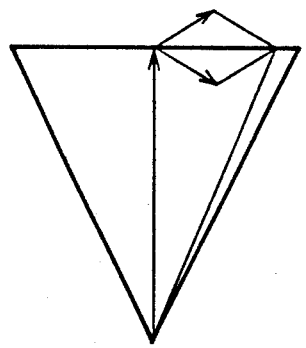
Figure 7B:
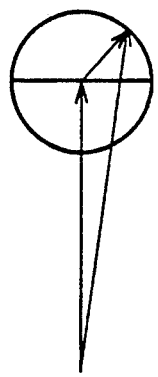
Figure 7C:
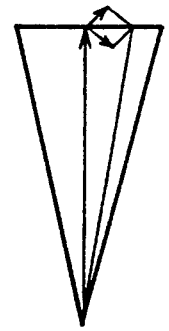
Figure 13:
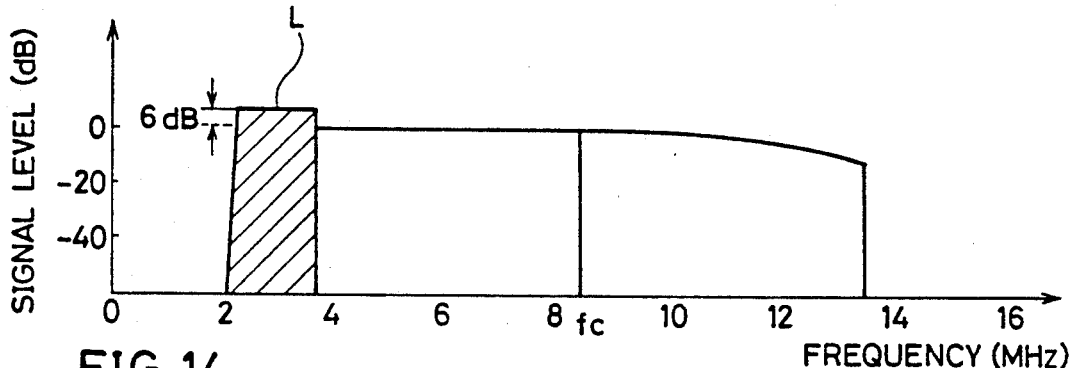
FIG. 13 to FIG. 15 are frequency spectrum diagrams for explaining an operation of the video disc player shown in FIG. 12.

By the BPF 15 having a cut-off frequency of 2 MHz–13.5 MHz, a signal component excluding a high frequency component corresponding to the upper side band H of the fine components of FIG. 11 is taken from the FM modulated color video signal which is reproduced from the video disc by the pick-up 13, and is applied to the limiter amplifier 16 as a signal having such a frequency spectrum as shown in FIG. 13. More specifically, as described above in connection with FIG. 3, taking into account the fact that originally a high frequency component of a reproduced output of the pick-up 13 is remarkably deteriorated, improvement of the S/N ratio is intended by completely removing by the BPF 15 beforehand the high frequency component corresponding to the upper side band of the fine components from the pick-up output.

The signal which has passed through the BPF 15 includes, as shown in FIG. 13, only the lower side band L of the fine component of the FM modulated color video signal. If an amplitude of the output of the BPF 15 is limited by the limiter amplifier 16, a signal having such a frequency spectrum as shown in FIG. 14 is obtained. More specifically, the output of the BPF 15 does not include the upper side band of the fine component, as described above, so that as a result of an amplitude limitation by the limiter amplifier 16, the level of the lower side band L of the fine component becomes half of that before limitation of the amplitude (FIG. 13), and at the same time, an upper side band H of the same level is generated. When the FM modulated color video signal which is an output of such a limiter amplifier 16 is demodulated in the FM demodulation circuit 17, a fine color video signal whose fine component M is not attenuated can be obtained, as shown in FIG. 15. Accordingly, a picture of high resolution can be obtained by connecting a display device to such a video disc player.

On the other hand, a cut-off frequency of the LPF 18 is set as to pass only an EFM audio signal, so that only the EFM audio signal thus passed is applied to the digital decoder 19. An output of the digital decoder 19 is separated into digital audio signals of the channel 1 and the channel 2 by the channel separating circuit 20 as described above, thereafter they are converted into analog audio signals and output.

Figure 16:
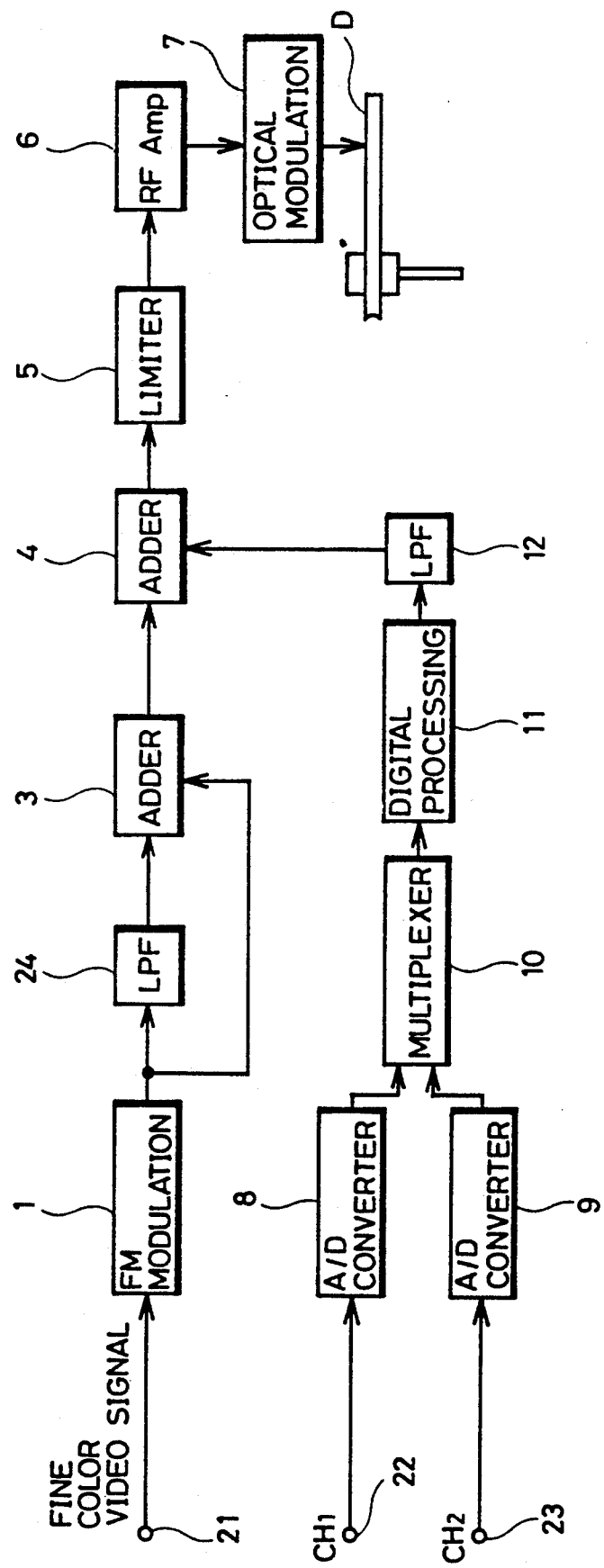
FIG. 16 is a block diagram showing a variation of the embodiment shown in FIG. 1.
Figure 17:
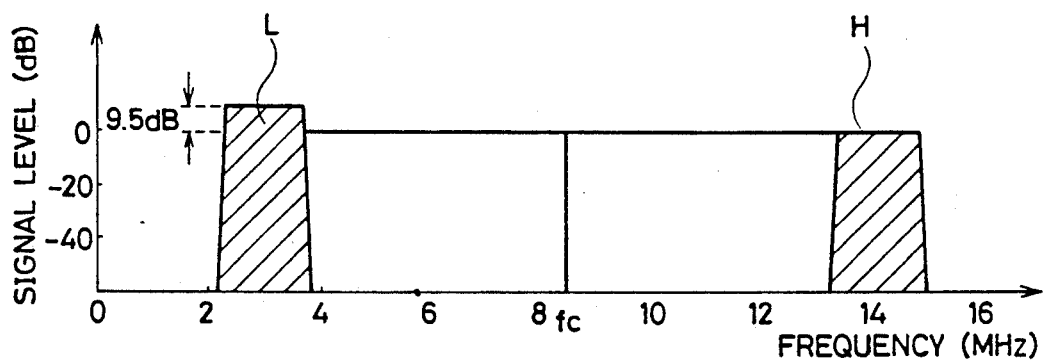
FIG. 17 is a frequency spectrum diagram for explaining an operation of the variation shown in FIG. 16.

FIG. 16 is a block diagram showing a variation of the embodiment shown in FIG. 1. The variation shown in FIG. 16 is the same as the embodiment shown in FIG. 1 except the following points. More specifically, an LPF 24 is provided instead of the HPF 2 in FIG. 1. Accordingly, in the embodiment of FIG. 16, the lower side band L of the fine component of the FM modulated color video signal shown in FIG. 8 is taken out to be input to one input of the adder 3, and the adder 3 amplifies the taken signal by means of a variable gain amplifier (not shown) and adds the same to the original FM modulated color video signal, whereby as shown in FIG. 17, the level of the lower side band L of the fine component of the FM modulated color video signal is raised by 9.5 dB contrary to the frequency spectrum of FIG. 9. Even though the level of the lower side band is raised, the levels of both the side bands become the same after passing through the limiter amplifier 5, so that the FM modulated color video signal to be recorded on the video disc will be the same as that of the first embodiment (FIG. 11).

Figure 19:
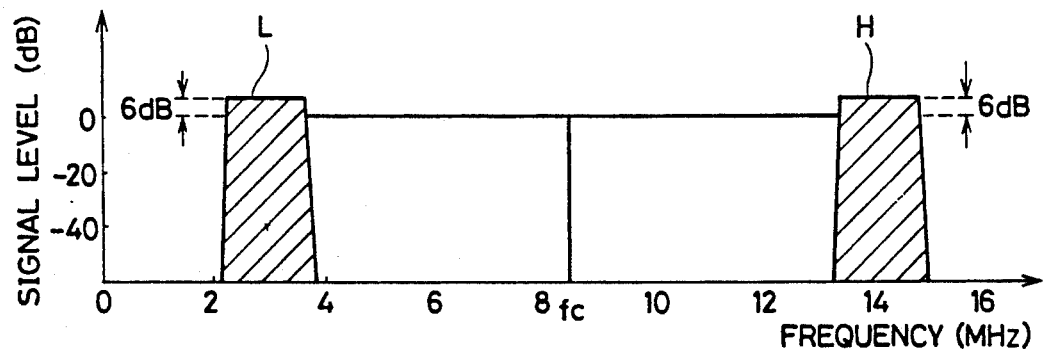
FIG. 19 is a frequency spectrum diagram for explaining an operation of the variation shown in FIG. 18.
Figure 18:
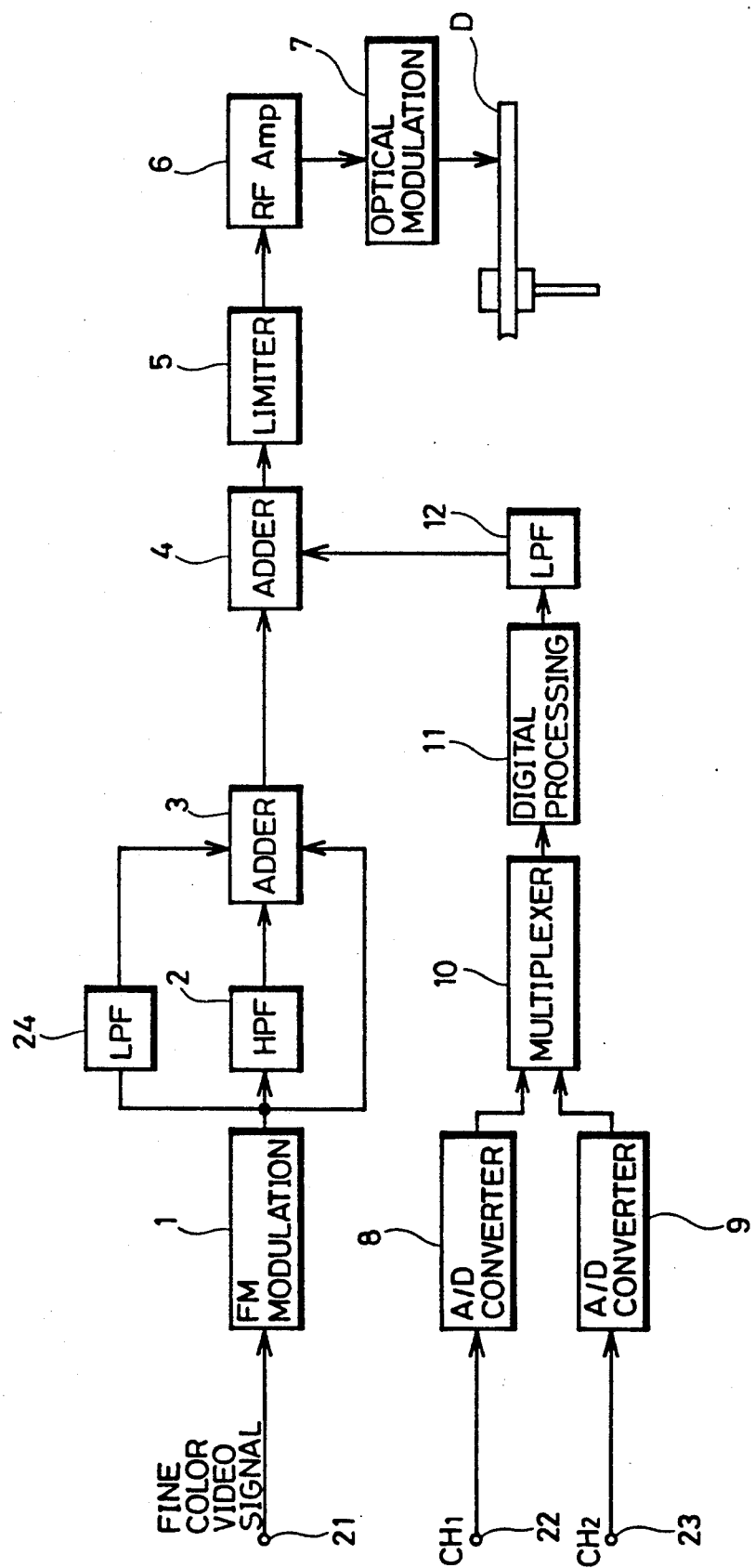
FIG. 18 is a block diagram showing another variation of the embodiment shown in FIG. 1.

FIG. 18 is a block diagram showing another variation of the embodiment shown in FIG. 1. The variation shown in FIG. 18 is the same as the embodiment shown in FIG. 1 except the following points. More specifically, an LPF24 is provided in addition to the HPF2 in FIG. 1. Accordingly, in the embodiment of FIG. 18, the upper and lower side bands H and L of the fine component of the FM modulated color video signal shown in FIG. 8 are taken out to be input to the adder 3, and the adder 3 amplifies the taken signals by means of variable gain amplifiers (not shown) and adds the same to the original FM modulated color video signal, whereby as shown in FIG. 19, the level of each of the upper and lower side bands H and L of the fine component of the FM modulated color video signal is raised by 6 dB. Even though the levels of the upper and lower side bands are raised, the FM modulated color video signal to be recorded on the video disc will be the same as that of the first embodiment (FIG. 11).

As the foregoing, according to the embodiments of the present invention, the FM modulated color video signal is recorded on the video disc with the levels of both the side bands being raised, and in addition, in reproduction by the video disc player, an amplitude is limited after an intentional removal of the high frequency component of the reproduced FM modulated color video signal which is remarkably deteriorated by the optical pick-up, so that deterioration of the high frequency component of the fine color video signal after FM demodulation can be compensated and the S/N ratio can be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of recording a fine color video signal on optical recording medium, comprising the steps of:
   supplying a fine color video signal comprising a fine component in a high frequency area,
   FM modulating said fine color video signal,
   raising a level of at least one of upper and lower side bands of the fine component of said FM modulated color video signal by a predetermined level,
   limiting an amplitude of the FM modulated color video signal with the level of said side band being raised, and
   optically recording on said recording medium said FM modulated color video signal with said amplitude thereof being limited.

2. A recording method according to claim 1, wherein said step of raising the level of said side band comprises the steps of:
   extracting at least one of the upper and lower side bands of the fine component from said FM modulated color video signal, and
   adding the extracted side band to said FM modulated color video signal.

3. A recording method according to claim 1, further comprising the step of frequency-multiplexing a digital audio signal into said FM color video signal with a level of the side band being raised.

4. A recording method according to claim 1, wherein said side band to be raised is the upper side band of the fine component.

5. A recording method according to claim 1, wherein said side band to be raised is the lower side band of the fine component.

6. A recording method according to claim 1, wherein said side bands to be raised are both the upper and lower side bands of the fine component.

7. A recording method according to claim 1, wherein said step of limiting an amplitude comprises the step of equalizing by using a limiter amplifier the levels of the upper and the lower side bands of the fine component of said FM modulated color video signal to an intermediate level between both the side band levels before limitation of amplitude.

8. A method of reproducing a fine color video signal from an optical recording medium, wherein an FM modulated color video signal having a level of at least one of upper and lower side bands of a fine component thereof being raised by a predetermined level is recorded on said optical recording medium with an amplitude being limited, said reproducing method comprising the steps of:
   optically reproducing said FM modulated color video signal from said recording medium,
   removing a high frequency component from said reproduced FM modulated color video signal,
   limiting an amplitude of said FM modulated color video signal from which said high frequency component is removed, and
   FM demodulating said FM modulated color video signal whose amplitude is limited.

9. A reproducing method according to claim 8, wherein said high frequency component to be removed is a component corresponding to the upper side band of the fine component.

10. A reproducing method according to claim 8, further comprising the step of separating a digital audio signal from said reproduced FM modulated color video signal.

11. A reproducing method according to claim 8, wherein said step of limiting the amplitude comprises the step of equalizing by a limiter amplifier the levels of the upper and the lower side bands of said FM demodulated color video signal to half the level of the lower side band before limitation of the amplitude.

12. A video disc player for reproducing a fine color video signal from a video disc, wherein an FM modulated color video signal obtained by FM modulating a fine color video signal including a fine component in a high frequency area is optically recorded with its amplitude being limited after a level of at least one of upper and lower side bands of a fine component being raised, said video disc player comprising:
   means for optically reproducing said FM modulated color video signal from said video disc, means for removing a high frequency component from said reproduced FM modulated color video signal, means for limiting an amplitude of said FM modulated color video signal from which said high frequency component is removed, and means for FM demodulating said FM modulated color video signal with said amplitude thereof limited.

13. A video disc player according to claim 12, wherein said high frequency component to be removed is a component corresponding to the upper side band of the fine component.

14. A video disc player corresponding to claim 12, further comprising means for separating a digital audio signal from said reproduced FM modulated color video signal.

15. A video disc player according to claim 12, wherein said means of limiting the amplitude comprises a limiter amplifier for equalizing the levels of the upper and the lower side bands of said FM modulated color video signal to half the level of the lower side band before limitation of amplitude.

* * * * *